United States Patent [19]

Minami et al.

[11] Patent Number: 4,967,616
[45] Date of Patent: Nov. 6, 1990

[54] SHIFT MECHANISM IN POWER TRANSFER DEVICE

[75] Inventors: Hiroshi Minami; Hideo Hamano, both of Toyota; Toshio Yoshinaka, Nagoya; Shinji Ogawa; Akihiko Ichikawa, both of Toyota, all of Japan

[73] Assignee: Toyota Jidosha Kabushiki Kaisha, Toyota, Japan

[21] Appl. No.: 395,572

[22] Filed: Aug. 18, 1989

[30] Foreign Application Priority Data

Jan. 31, 1989 [JP] Japan ............... 1-10374[U]

[51] Int. Cl.$^5$ .......................................... F16H 5/08
[52] U.S. Cl. ........................................ 74/335; 74/475; 180/247
[58] Field of Search ...... 74/665 G, 665 GA, 665 GE, 74/665 T, 333, 335, 473 R, 477, 475; 180/247, 248

[56] References Cited

U.S. PATENT DOCUMENTS

| | | | |
|---|---|---|---|
| 4,682,516 | 7/1987 | Okubo | 180/247 X |
| 4,690,015 | 9/1987 | Nagano et al. | 74/665 T X |
| 4,704,917 | 11/1987 | Hiroyasu | 74/475 |
| 4,711,136 | 12/1987 | Yoshinaka et al. | 74/665 GA |
| 4,713,980 | 12/1987 | Ida et al. | 74/467 |
| 4,719,814 | 1/1988 | Ida et al. | 74/477 |
| 4,723,459 | 2/1988 | Yoshinaka et al. | 74/477 |
| 4,730,517 | 3/1988 | Hamano et al. | 74/785 |
| 4,770,280 | 9/1988 | Frost | 74/477 |
| 4,804,061 | 2/1989 | Kameda | 74/665 GE |
| 4,838,121 | 6/1989 | Takeshita et al. | 74/785 |
| 4,876,919 | 10/1989 | Nagano et al. | 180/247 X |
| 4,883,138 | 11/1989 | Kameda et al. | 180/248 X |

FOREIGN PATENT DOCUMENTS 61-157440 7/1986 Japan.
61-207219 9/1986 Japan.
61-211569 9/1986 Japan.

*Primary Examiner*—Dwight Diehl
*Attorney, Agent, or Firm*—Oblon, Spivak, McClelland, Maier & Neustadt

[57] ABSTRACT

A power transfer device of the type which includes a housing, a first shaft rotatably mounted within the housing to transfer drive torque from a power transmission to a set of rear-wheel drive axles, a second shaft rotatably mounted within the housing in parallel with the first shaft for drive connection to a set of front-wheel drive axles, and a pair of clutch sleeves mounted on the first and second shafts and shiftable between respective positions in which they effect drive connection or disconnection between the first and second shafts. A shift mechanism for the clutch sleeves includes a shift rod arranged in parallel with the first and second shafts and axially movably mounted within the housing, a first shift fork axially slidably mounted on the shift rod and coupled with one of the clutch sleeves, a second shift fork fixedly mounted on the shift rod at a position adjacent the first shift fork and coupled with the other clutch sleeve, and a retainer element fixed to the shift rod at a position where it is spaced in a predetermined distance from the first shift fork when the second shift fork is maintained in engagement with the first shift fork.

5 Claims, 4 Drawing Sheets

SHIFT MECHANISM IN POWER TRANSFER DEVICE

BACKGROUND OF THE INVENTION

1. Field of the Invention

The present invention relates to a power transfer device for four-wheel drive vehicles, and more particularly to a shift mechanism in the power transfer device.

2. Description of the Prior Art

In Japanese Patent Early Publication No. 61-207219, there has been proposed a power transfer device for four-wheel drive adapted for use in combination with a primary power transmission of an automotive vehicle. The power transfer device includes a housing, a first shaft rotatably mounted within the housing and having an input end for drive connection to an output shaft of the power transmission and an output end for drive connection to a set of rear-wheel or front-wheel drive axles, a second shaft rotatably mounted within the housing in parallel with the first shaft and having an output end for drive connection to a set of front-wheel or rear-wheel drive axles, and a shift mechanism including a pair of clutch sleeves each mounted on the first and second shafts and shiftable between respective positions in which they effect drive connection or disconnection between the first and second shafts, a shift rod arranged in parallel with the first and second shafts and axially movably mounted within the housing, and a shift fork mounted on the shift rod for axial movement therewith and coupled with the clutch sleeves for shifting them in response to the axial movement of the shift rod.

In the case that an ancillary change-speed mechanism, a limited-slip differential and the like are mounted on the first shaft, shifting amounts of the clutch sleeves are restricted respectively in a different distance. In a condition where one of the clutch sleeves is arranged to be axially shifted in a small distance while the other clutch sleeve to be axially shifted in a large distance, the shift fork does not act to shift the latter clutch sleeve to its stroke end. To avoid such a problem, the single shift fork may be replaced with two shift forks which are mounted on two parallel shift rods and coupled with the clutch sleeves, respectively. In such an arrangement, however, a shift mechanism for the two shift rods becomes complicated in construction and large in size.

SUMMARY OF THE INVENTION

It is, therefore, a primary object of the present invention to provide an improved shift mechanism for the power transfer device wherein both the clutch sleeves can be simultaneously shifted by a single shift rod to their stroke ends in a simple construction without casing any problem described above.

According to the present invention, the object is attained by providing a power transfer device for an automotive vehicle which comprises a housing, a first shaft rotatably mounted within the housing to be applied with drive torque from a prime mover of the vehicle and having an output end for drive connection to a set of rear-wheel or front-wheel drive axles, a second shaft rotatably mounted within the housing in parallel with the first shaft and having an output end for drive connection to a set of front-wheel or rear-wheel drive axles, and a pair to clutch sleeves each mounted on the first and second shafts and shiftable between respective positions in which they effect drive connection or disconnection between the first and second shafts, wherein a shift mechanism for the clutch sleeves comprises a single shift rod arranged in parallel with the first and second shafts and axially movably mounted within the housing, a first shift fork axially slidably mounted on the shift rod and coupled with one of the clutch sleeves, a second shift fork fixedly mounted on the shift rod at a position adjacent the first shift fork and coupled with the other clutch sleeve, and a retainer element integrally provided on the shift rod at a position where it is spaced in a predetermined distance from the first shift fork when the second shift fork is maintained in engagement with the first shift fork.

In a practical embodiment of the power transfer device, the shift rod is formed thereon with first and second cam grooves which are located adjacent the retainer element and axially spaced in a predetermined distance slightly larger than the distance between the retainer element and the first shift fork, and the first shift fork is provided therein with a spring loaded detent element which is selectively engaged with the cam grooves of the shift rod.

BRIEF DESCRIPTION OF THE DRAWINGS

Other objects, features and advantages of the present invention will be readily appreciated as the same becomes better understood by reference to the following detailed description when considered in connection with the accompanying drawings, in which.

DESCRIPTION OF THE PREFERRED EMBODIMENTS

Figure 1:
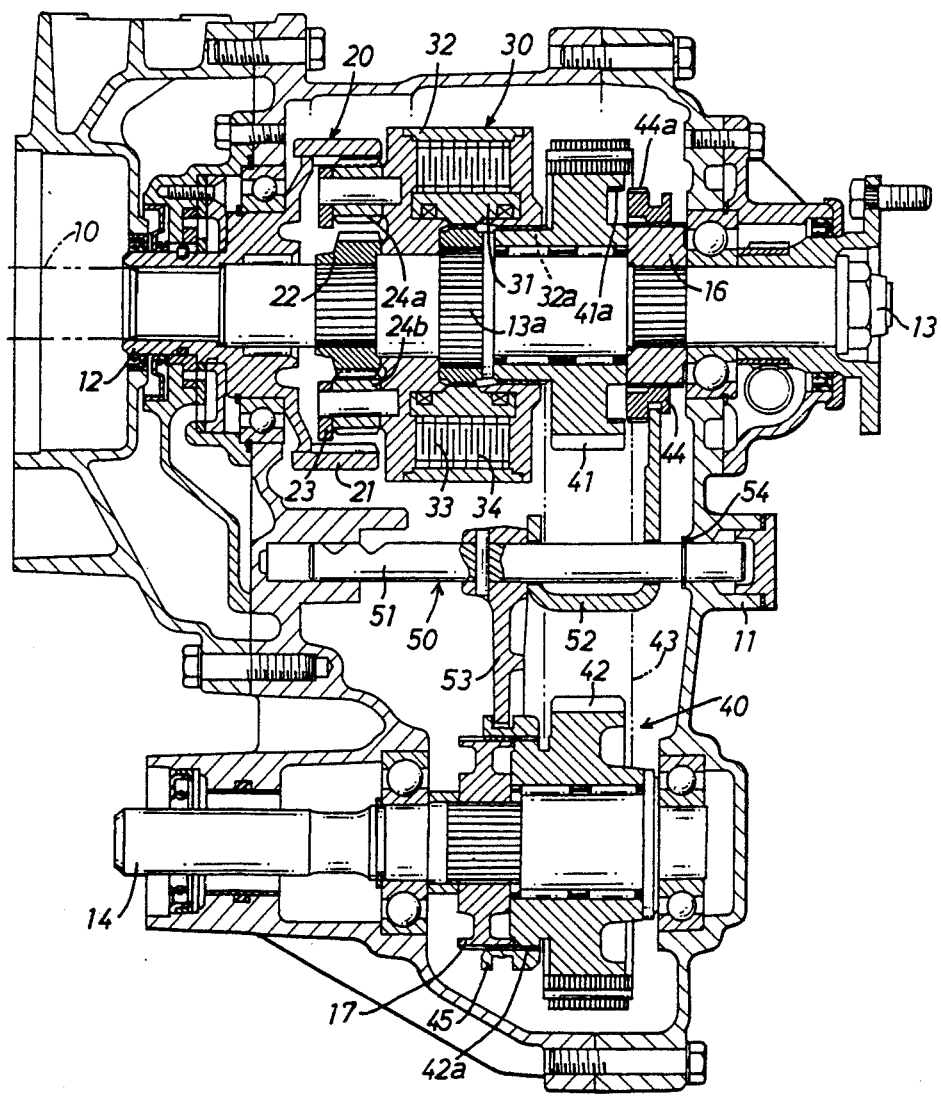
FIG. 1 is a full sectional view of a power transfer device.

Referring now to the drawings, FIG. 1 illustrates a power transfer device for part-time four-wheel drive adapted for use in combination with a primary power transmission (not shown) of an automotive vehicle. The power transfer device includes a housing 11 secured at its left end to a casing of the power transmission. The power transfer device includes, as main components, an input shaft 12, a first output shaft 13, a second output shaft 14, a planetary gear unit 20, a viscous fluid coupling 30, a drive connection mechanism 40, and a shift mechanism 50 in accordance with the present invention. The input shaft 12 is rotatably mounted on a left-hand side wall of the housing 11 through a ball bearing and has an internally splined portion for connection to an output shaft 10 of the power transmission. The first output shaft 13 is rotatably mounted on a right-hand side wall of the housing 11 through a ball bearing and is arranged coaxially with the input shaft 12. The first output shaft 13 has an inner end portion coupled within a hollow inner end portion of input shaft 12 through a needle bearing for relative rotation and has an output end for drive connection to a set of rear-wheel drive axles (not shown) through a propeller shaft (not shown). The second output shaft 14 is arranged in parallel with the input and output shafts 12 and 13 and is rotatably mounted within the housing 11 through a pair of axially spaced ball bearings for drive connection to a set of front-wheel drive axles (not shown).

The planetary gear unit 20 includes a ring gear 21 coupled with an internal annular flange of input shaft 12 for rotation therewith, a sun gear 22 splined to the output shaft 13 for rotation therewith, a carrier 23 integrally assembled with a drum-like outer casing 32 of the viscous fluid coupling 30, and a plurality of planetary gears 24a, 24b rotatably supported by the carrier 23 and in mesh with the ring gear 21 and sun gear 22, respectively. The viscous fluid coupling 30 includes an inner sleeve member 31 rotatably coupled within the outer casing 32 in a fluid-tight manner for relative rotation, a first set of annular plates 33 assembled with the inner sleeve member 31 for rotation therewith, and a second set of annular plates 34 assembled with the outer casing 32 for rotation therewith and interleaved with the annular plates 33. A sealed chamber formed between the inner sleeve member 31 and outer casing 32 is filled with an amount of viscous fluid such as silicone oil or the like. In the viscous fluid coupling 30, the inner sleeve member 31 is splined to a hub member which is splined to an intermediate portion 13a of first output shaft 13 for rotation therewith, and the outer casing 32 is rotatably mounted on the first output shaft 13.

The drive connection mechanism 40 includes a drive sprocket 41 rotatably mounted on the first output shaft 13 through needle bearings, a driven sprocket 42 rotatably mounted on the second output shaft 14 through needle bearings and drivingly connected to the drive sprocket 41 by means of a drive chain 43, and a pair of internally splined clutch sleeves 44 and 45 respectively provided on the first and second output shafts 13 and 14. The drive sprocket 41 is formed at its left side with an external spline in mesh with an internally splined portion 32a of outer casing 32. The clutch sleeve 44 is axially slidably mounted on a hub member 16 which is splined to the first output shaft 13 at a position adjacent the drive sprocket 41 for rotation therewith. The clutch sleeve 44 has an external spline 44a engageable with an internally splined portion 41a of drive sprocket 41 for drive connection between the first output shaft 13 and drive sprocket 41. The clutch sleeve 45 is axially slidably mounted on a hub member 17 which is splined to the second output shaft 14 at a position adjacent the driven sprocket 42 for rotation therewith. The clutch sleeve 45 is engageable with an externally splined portion 42a of driven sprocket 42 for drive connection between the driven sprocket 42 and the second output shaft 14.

Figure 2:
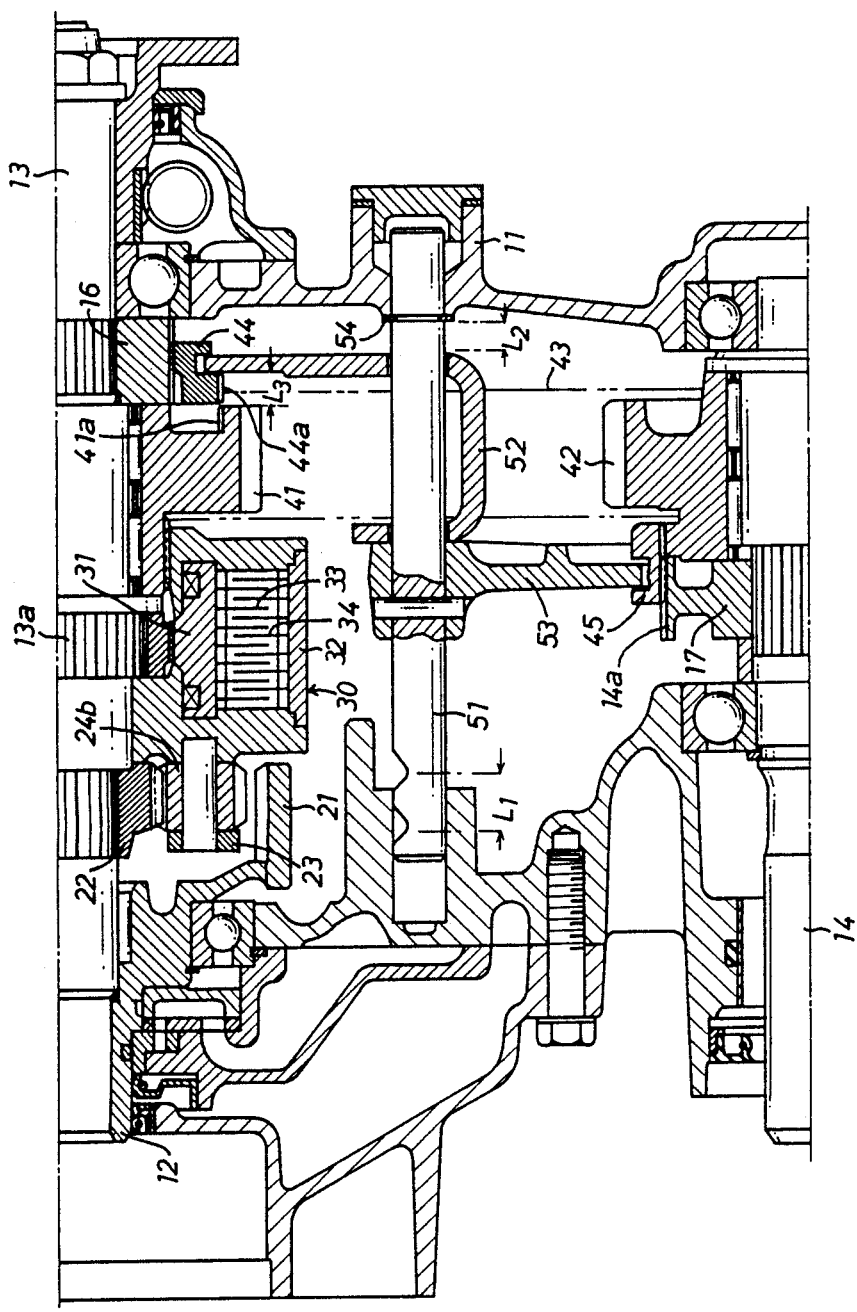
FIG. 2 is an enlarged sectional view of a manually operated shift mechanism in the power transfer device.

As shown in FIGS. 1 and 2, the shift mechanism 50 includes a shift rod 51 axially slidably mounted within the housing 11 and a pair of shift forks 52 and 53 mounted on the shift rod 51. The shift rod 51 is located between the output shafts 13 and 14 and arranged in parallel therewith. The shift rod 51 is shifted by operation of a manual shift lever (not shown) and retained in a shifted position by means of a detent mechanism (not shown). In this embodiment, the shifting amount of shift rod 51 is defined in a distance $L_1$. The shift fork 52 is in the form of a U-letter shaped member which is axially slidably mounted on the shift rod 51 and coupled with the clutch sleeve 44. The shift fork 53 is fixedly mounted on the shift rod 51 at a position adjacent a left-hand arm of shift fork 52 and is coupled with the clutch sleeve 45. A retainer element in the form of a snap ring 54 is fixedly coupled with a right-hand portion of the shift rod 51 and is axially spaced in a distance $L_2$ from the shift fork 52 in a condition where the shift rod 51 is retained in a first position as shown in FIG. 2. The shifting amount $L_1$ of shift rod 51 is defined to correspond with a shifting amount necessary for the clutch sleeve 45. The distance $L_2$ is defined in a relationship of $L_1 = L_2 + L_3$ in the case that a shifting amount necessary for the clutch sleeve 44 is restricted to be $L_3$ less than the distance $L_1$.

Hereinafter, operation of the power transfer device will be described with reference to FIGS. 1 and 2. Assuming that the shift rod 51 is retained by the detent mechanism in the first position for four-wheel drive, the clutch sleeve 44 is retained by the shift fork 52 in a first position as shown in FIG. 2 to disconnect the drive sprocket 41 from the first output shaft 13, while the clutch sleeve 45 is retained by the shift fork 53 in a first position to connect the driven sprocket 42 to the second output shaft 14. When the input shaft 12 is applied with drive torque from the power transmission, the ring gear 21 of planetary gear unit 20 is driven by the drive torque applied thereto from input shaft 12 to rotate the sun gear 22 and carrier 23. Thus, the first output shaft 13 rotates with the sun gear 22 to transfer the drive torque to the rear-wheel drive axles therethrough, and the outer casing 32 of coupling 30 rotates with the carrier 23 to transfer the drive torque to the drive sprocket 41. In turn, the driven sprocket 42 is driven by the drive torque applied thereto from the drive sprocket 41 through the drive chain 43 to transfer the drive torque to the front-wheel drive axles through the second output shaft 14 thereby to establish a four-wheel drive mode at the power transfer device. During travel of the vehicle in the four-wheel drive mode, the planetary gear unit 20 acts to permit differential action between the front and rear road wheels so as to prevent the occurrence of a tight-corner braking phenomenon. Additionally, the viscous fluid coupling 30 acts as a limited-slip differential to enhance driveability of the vehicle on rough roads.

When the shift rod 51 is shifted by operation of the manual shift lever leftwards in the distance $L_1$ for two-wheel drive, the clutch sleeve 45 is moved by the shift fork 53 leftwards in the same distance $L_1$ and disengaged from the driven sprocket 42 to permit free rotation of the second output shaft 14 with respect to the driven sprocket 42. Simultaneously, the snap ring 54 is brought into engagement with the shift fork 52 when it has been moved leftwards in th distance $L_2$ and causes the shift fork 52 to move leftwards in the distance $L_3$. Thus, the clutch sleeve 44 is shifted by the shift fork 52 leftwards in the distance $L_3$ to drivingly connect the drive sprocket 41 to the first output shaft 13. This causes the functions of the planetary gear unit 20 and viscous fluid coupling 30 ineffective. As a result, a two-wheel drive mode is established at the power transfer device to transfer the drive torque only to the rear-wheel drive axles through the first output shaft 13.

When the shift rod 51 is shifted by operation of the manual shift lever rightwards in the distance $L_1$ for four-wheel drive, the clutch sleeve 45 is moved by the shift fork 53 rightwards in the same distance $L_1$. In the course of rightward movement of the shift rod 51, the shift fork 53 is brought into engagement with the shift fork 52 when it has been shifted rightwards in the distance $L_2$ and causes the shift fork 52 to move rightwards in the distance $L_3$. Thus, the clutch sleeve 44 is returned by the shift fork 52 to the first position to select the four-wheel drive mode at the power transfer device.

From the above description, it will be understood that both the clutch sleeves 44 and 45 can be simultaneously shifted by the single shift rod 51 to their stroke ends in a simple construction.

Figure 3:
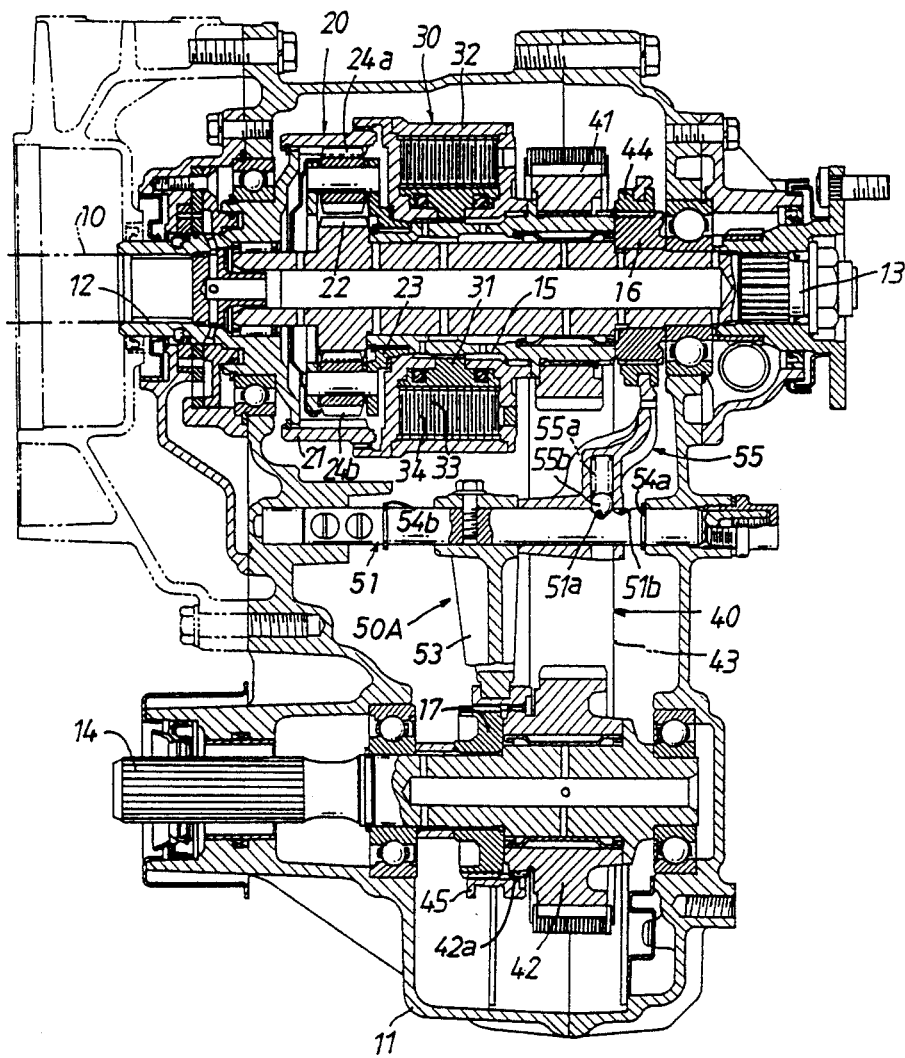
FIG. 3 is a full sectional view of a modification of the power transfer device.

In FIG. 3 there is illustrated a modification of the power transfer device described above, wherein a hollow shaft 15 is rotatably mounted on an intermediate portion of the first output shaft 13 to support thereon the viscous fluid coupling 30 and the drive gear 41. In this modified power transfer device, the ring gear 21 of planetary gear unit 20 is coupled with a cylindrical flange of the outer casing 32 of fluid coupling 30 for rotation therewith, the carrier 23 is splined to the left-hand portion of hollow shaft 15 for rotation therewith, the inner sleeve member 31 of fluid coupling 30 is splined to an intermediate portion of hollow shaft 15 for rotation therewith, and the outer casing 32 of fluid coupling 30 is rotatably mounted on the hollow shaft 15 for relative rotation thereto. The drive sprocket 41 is splined to the right-hand portion of hollow shaft 15 for rotation therewith, the hub member 16 is splined to the first output shaft 13 at a position adjacent the right end of hollow shaft 15, and the clutch sleeve 44 is arranged to be engageable with an externally splined portion 15a of hollow shaft 15 for drive connection between the first output shaft 13 and hollow shaft 15.

Figure 4:
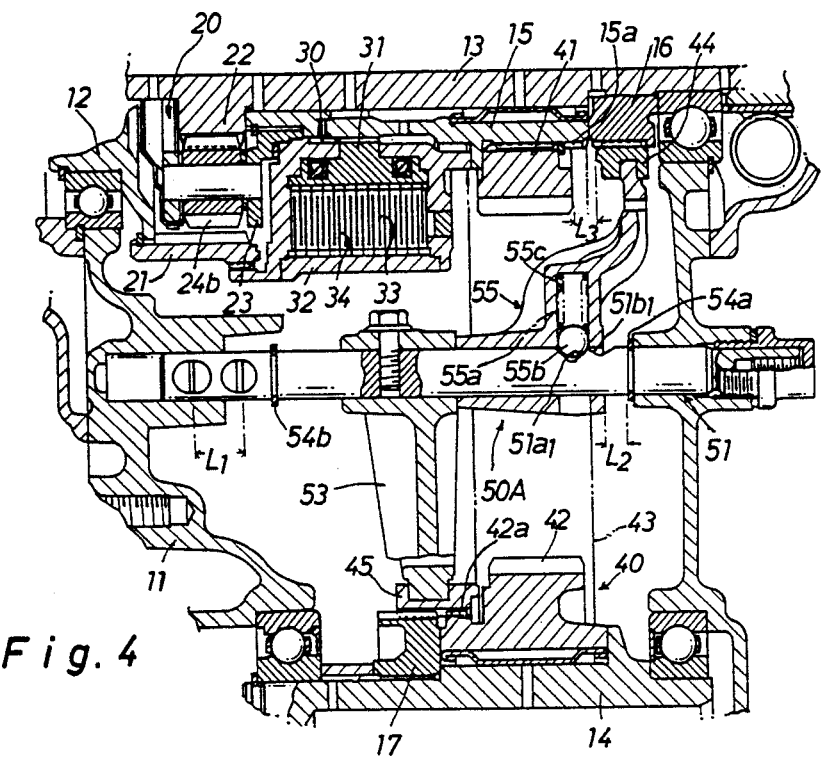
FIGS. 4 and 5 each are an enlarged sectional view of a manually operated shift mechanism in the power transfer device shown in FIG. 3, showing operated conditions of the shift mechanism.

In a modified shift mechanism 50A of the power transfer device, a pair of axially spaced snap rings 54a and 54b are fixedly coupled with the shift rod 51, and the shift fork 52 of FIG. 1 is replaced with a shift fork 55 which is axially slidably mounted on the shift rod 51 and coupled with the clutch sleeve 44. As shown in FIG. 4, the right-hand snap ring 54a is spaced in the distance $L_2$ from the shift fork 55 in a condition where the shift rod 51 is retained in the first position. The shift rod 51 is formed thereon with axially spaced V-grooves 51a and 51b adjacent the right-hand snap ring 54a. The inclined surfaces of V-grooves 51a, 51b are formed as cam surfaces $51a_1$, $51b_1$, respectively, and the axial space between the bottoms of V-grooves 51a, 51b is determined to be slightly larger than the distance $L_2$. The shift fork 55 has a bore 55c in which a detent ball 55b is disposed through a compression spring 55a. The detent ball 55b is selectively engaged with the V-grooves 51a, 51b under the load of compression spring 55a to retain the shift fork 55 in place on the shift rod 51. In a condition where the shift fork 55 is maintained in engagement with the shift fork 53, the detent ball 55b is engaged with the left-hand V-groove 51a to urge the shift fork 55 toward the shift fork 53. When the shift fork 55 has been engaged with the right-hand snap ring 54a as shown in FIG. 5, the detent ball 55b is engaged with the right-hand V-groove 51b to urge the shift fork 55 toward the snap ring 54a.

Assuming that in operation the shift rod 51 is retained in the first position for four-wheel drive, the clutch sleeve 44 is retained by the shift fork 55 in the first position as shown in FIG. 4 to disconnect the hollow shaft 15 from the first output shaft 13, while the clutch sleeve 45 is retained by the shift fork 53 in the first position to connect the driven sprocket 42 to the second output shaft 14. When the input shaft 12 is applied with the drive torque from the power transmission, the ring gear 21 of planetary gear unit 20 is driven by the drive torque applied thereto from input shaft 12 to rotate the sun gear 22 and carrier 23. Thus, the first output shaft 13 rotates with the sun gear 22 to transfer the drive torque to the rear-wheel drive axles therethrough, and the hollow shaft 15 rotates with the carrier 23 to transfer the drive torque to the drive sprocket 41. In turn, the driven sprocket 42 is driven by the drive torque applied thereto from the drive sprocket 41 through the drive chain 43 to transfer the drive torque to the front-wheel drive axles through the second output shaft 14 thereby to establish a four-wheel drive mode at the power transfer device. During travel of the vehicle in the four-wheel drive mode, the planetary gear unit 20 acts to permit differential action between the front and rear road wheels, and the viscous fluid coupling 30 acts as a limited-slip differential to enhance driveability of the vehicle on rough roads.

Figure 5:
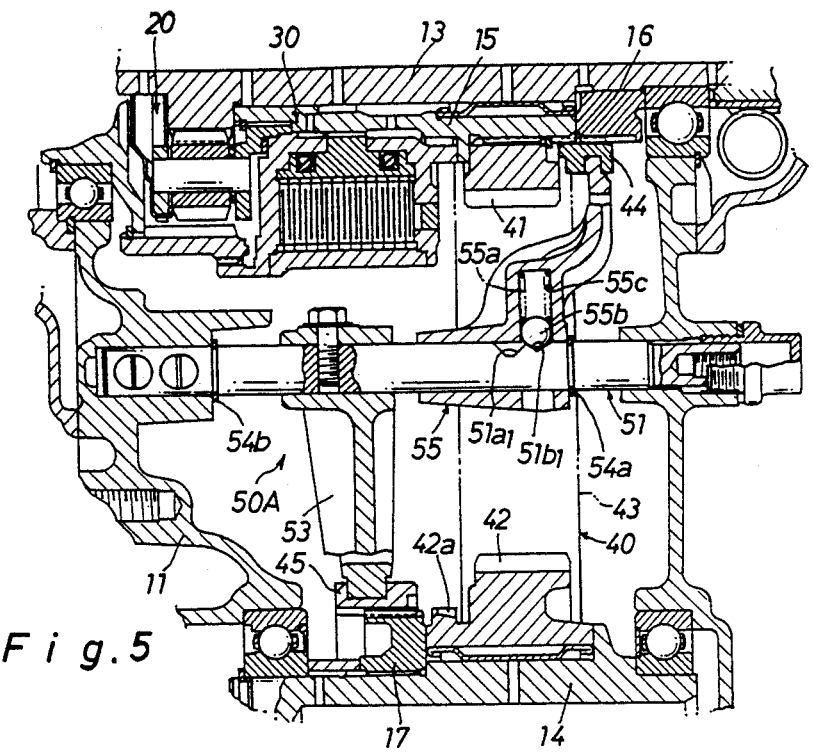

When the shift rod 51 is shifted by operation of the manual shift lever leftwards in the distance $L_1$ for two-wheel drive, the clutch sleeve 45 is moved by the shift fork 53 leftwards in the same distance $L_1$ and disengaged from the driven sprocket 42 as shown in FIG. 5. In the course of leftward movement of the shift rod 51, the detent ball 55b is retracted against the load of spring 55a to permit relative displacement between the shift rod 51 and shift fork 55. When the shift rod 51 has been shifted leftwards in the distance $L_2$, the snap ring 54a is brought into engagement with the shift fork 55 and causes the shift fork 55 to move leftwards in the distance $L_3$. In this instance, the detent ball 55b is brought into engagement with the right-hand V-groove 51b. Thus, as shown in FIG. 5, the clutch sleeve 44 is shifted by the shift fork 55 leftwards in the distance $L_3$ to drivingly connect the hollow shaft 15 to the first output shaft 13. This causes the functions of the planetary gear unit 20 and viscous fluid coupling 30 ineffective. As a result, a two-wheel drive mode is established at the power transfer device to transfer the drive torque only to the rear-wheel drive axles through the first output shaft 13.

When the shift rod 51 is shifted by operation of the manual shift lever rightwards in the distance $L_1$ for four-wheel drive, the clutch sleeve 45 is moved by the shift fork 53 rightwards in the same distance $L_1$. In the course of rightward movement of the shift rod 51, the shift fork 53 is brought into engagement with the shift fork 55 when it has been shifted rightwards in the distance $L_2$ and causes the shift fork 55 to move rightwards in the distance $L_3$. In this instance, the detent ball 55b is brought into engagement with the left-hand V-groove 51a. Thus, the clutch sleeve 44 is returned by the shift fork 55 to the first position to select the four-wheel drive mode at the power transfer device.

As is understood from the above description, the detent ball 55b acts to urge the shift fork 55 toward the shift fork 53 under the load of spring 55a when it has been maintained in engagement with the left-hand V-groove 51a of shift rod 51 during travel of the vehicle in the four-wheel drive mode. The detent ball 55b also acts to urge the shift fork 55 toward the snap ring 54a under the load of spring 55a when it has been maintained in engagement with the right-hand V-groove 51b of shift rod during travel of the vehicle in the two-wheel drive mode. This is useful to position the clutch sleeve 44 in place during travel of the vehicle.

Having now fully set forth both structure and operation of preferred embodiments of the concept underlying the present invention, various other embodiments as well as certain variations and modifications of the embodiments herein shown and described will obviously occur to those skilled in the art upon becoming familiar with said underlying concept. It is, therefore, to be understood that with the scope of the appended claims, the invention may be practiced otherwise than as specifically set forth herein.

What is claimed is:

1. A power transfer device for an automotive vehicle, comprising:

a housing;

a first shaft rotatably mounted within said housing to be applied with drive torque from a prime mover of the vehicle and having an output end for drive connection to a set of rear-wheel or front-wheel drive axles;

a second shaft rotatably mounted within said housing in parallel with said first shaft and having an output end for drive connection to a set of front-wheel or rear-wheel drive axles; and a pair of clutch sleeves mounted on said first and second shafts and shiftable between respective positions in which they effect drive connection or disconnection between said first and second shafts;

wherein a shift mechanism for said clutch sleeves comprises a single shift rod arranged in parallel with said first and second shafts and axially movably mounted within said housing; a first shift fork axially slidably mounted on said shift rod and coupled with one of said clutch sleeves, a second shift fork fixedly mounted on said shift rod at a position adjacent said first shift fork and coupled with the other clutch sleeve, and a retainer element integrally provided on said shift rod at a position where it is spaced in a predetermined distance from said first shift fork when said second shift fork is maintained in engagement with said first shift fork.

2. A power transfer device as claimed in claim 1, wherein said shift rod is formed thereon with first and second cam grooves which are located adjacent said retainer element and axially spaced in a predetermined distance slightly larger than the distance between said retainer element and said first shift fork, and wherein said first shift fork is provided therein with a spring loaded detent element which is selectively engaged with the cam grooves of said shift rod.

3. A power transfer device as claimed in claim 1, wherein said retainer element is a snap ring fixedly coupled with said shift rod.

4. A power transfer device as claimed in claim 1, wherein said shift rod is arranged between said first and second shafts and in parallel therewith.

5. A power transfer device adapted for use in combination with a power transmission of an automotive vehicle, comprising:

a housing;

a first shaft rotatably mounted within said housing and having an input end for drive connection to an output shaft of said power transmission and an output end for drive connection to a set of rear-wheel or front-wheel drive axles;

a second shaft rotatably mounted within said housing in parallel with said first shaft and having an output end for drive connection to a set of front-wheel or rear-wheel drive axles;

a drive member rotatably mounted on said first shaft to be applied with drive torque from the output shaft of said power transmission and connectable to said first shaft;

a driven member rotatably mounted on said second shaft and connectable to said second shaft, said driven member being drivingly connected to said drive member;

a first clutch sleeve mounted on said first shaft at a position adjacent said drive member and shiftable between a first position where it is retained to disconnect said drive member from said first shaft and a second position where it is retained to connect said drive member to said first shaft; and a second clutch sleeve mounted on said second shaft at a position adjacent said driven member and shiftable between a first position where it is retained to connect said driven member to said second shaft and a second position where it is retained to disconnect said driven member from said second shaft;

wherein a shift mechanism for said clutch sleeves comprises a single shift rod arranged in parallel with said first and second shafts and axially movably mounted within said housing; a first shift fork axially slidably mounted on said shift rod and coupled with said first clutch sleeve, a second shift fork fixedly mounted on said shift rod at a position adjacent said first shift fork and coupled with said second clutch sleeve, and a retainer element integrally provided on said shift rod at a position where it is spaced in a predetermined distance from said first shift fork when said second shift fork is maintained in engagement with said first shift fork.

* * * * *